S. L. CASELLA.
BATTERY CAPPING MACHINE.
APPLICATION FILED JAN. 2, 1917.

1,246,876.

Patented Nov. 20, 1917.
7 SHEETS—SHEET 5.

INVENTOR.
Secondo L. Casella
BY Henry D. Williams
ATTORNEY

UNITED STATES PATENT OFFICE.

SECONDO L. CASELLA, OF NEW YORK, N. Y., ASSIGNOR TO CONRAD HUBERT, OF WHITE PLAINS, NEW YORK.

BATTERY-CAPPING MACHINE.

1,246,876.　　　　　Specification of Letters Patent.　　Patented Nov. 20, 1917.

Application filed January 2, 1917. Serial No. 140,335.

*To all whom it may concern:*

Be it known that I, SECONDO L. CASELLA, a citizen of the United States, residing at the borough of Manhattan, in the county of New York and State of New York, have invented certain new and useful Improvements in Battery-Capping Machines, of which the following is a specification, reference being had therein to the accompanying drawings, forming part thereof.

My invention relates generally to battery-making machines and relates particularly to an automatic machine for applying the usual brass contact-making cap to the projecting outer end of the carbon electrode rod of a usual dry battery cell. Heretofore in common practice these caps have been applied by means of crude hand-operated devices, and, so far as I am informed, my present invention provides the first automatic machine for this purpose.

The main object of my invention is to decrease the cost of manufacture of dry batteries by providing a machine for automatically applying these small brass caps to the carbon electrode rods, such machine doing this work far more rapidly than it could possibly be done by means of hand devices, as has been common heretofore. Other objects of my invention are to produce an automatic machine for this purpose which is strong, durable, efficient, dependable, convenient, simple in construction and inexpensive of manufacture. Other objects and advantages of my invention will hereinafter appear.

My invention includes features of construction and combinations of parts and sub-combinations thereof as will appear from the following description.

I shall now describe the battery capping machine embodying my invention illustrated in the accompanying drawings and shall thereafter point out my invention in claims.

Figures 5, 6, 7:
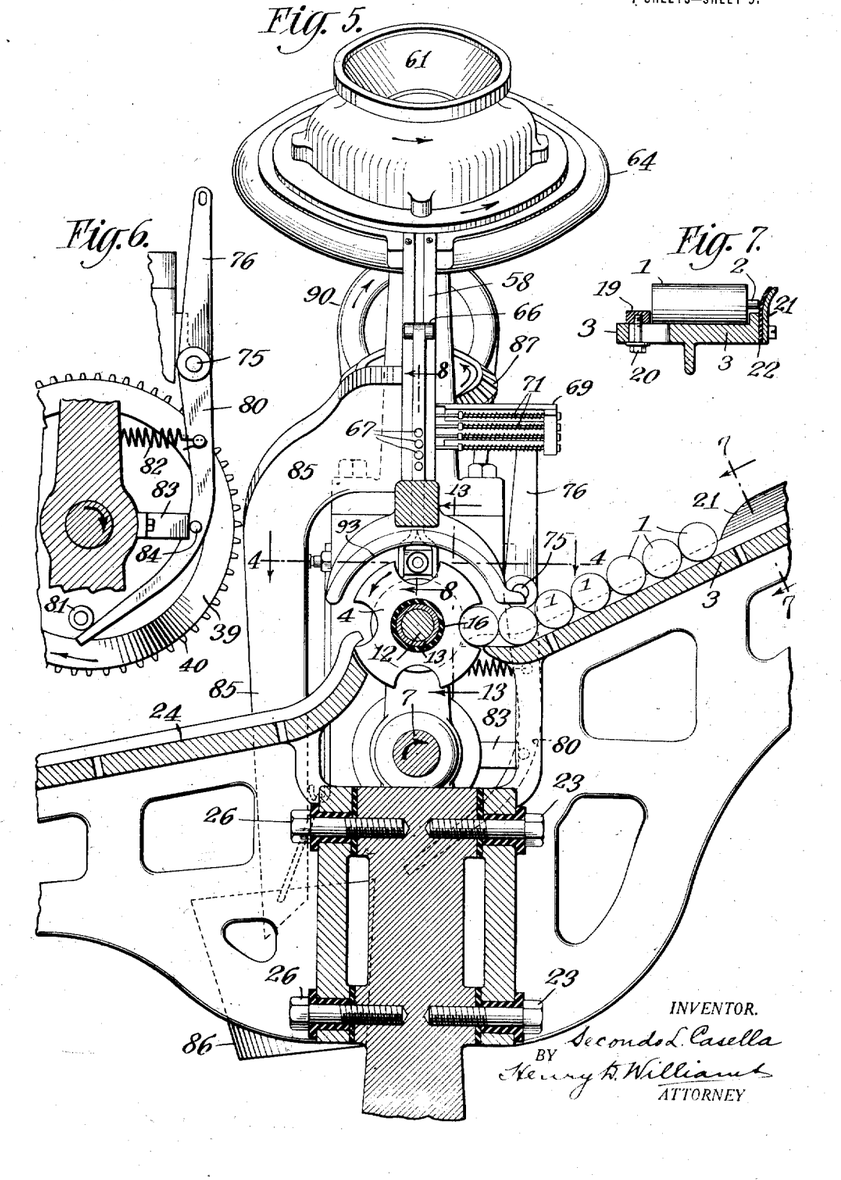
Fig. 5 is a similarly enlarged vertical transverse section on a plane indicated by the line 5—5 of Figs. 1, 3 and 4, as viewed from the left.
Fig. 6 is an elevation, with parts in section, of the ejector-operating means appearing in Fig. 5.
Fig. 7 is a transverse section of the upper part of the feed chute for the uncapped battery cells, the section being taken on a plane indicated by the inclined line 7—7 of Fig. 5 as viewed from the right.
Figures 8, 9, 10, 11, 12:
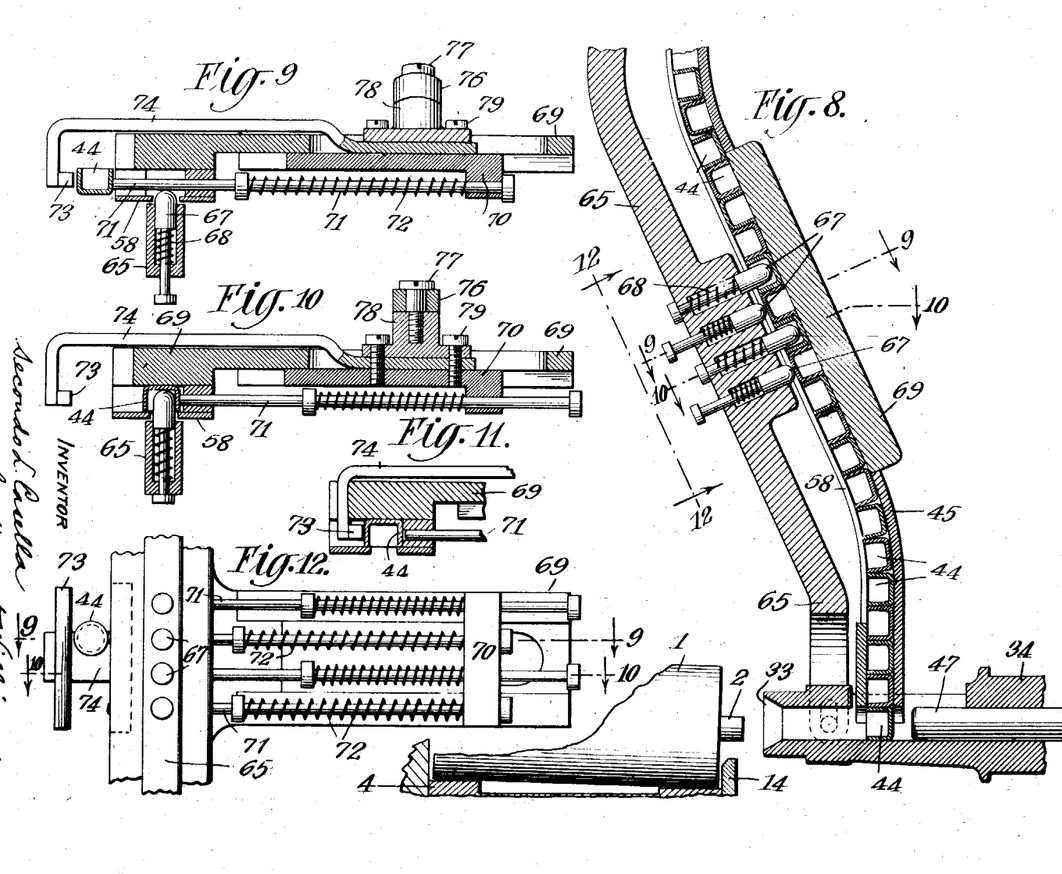
Fig. 8 is a further enlarged partial longitudinal vertical section on a plane indicated by the line 8—8 of Fig. 5 as viewed from the right, and illustrates in central longitudinal section the cap-delivering feed chute and parts of the cap-sorting means, including the cap-selecting feelers and their operating arm, parts being omitted.
Fig. 9 is a transverse section of the cap-delivering feed chute together with parts of the cap-sorting means, the section being taken on the line 9—9 of Fig. 12 as viewed from above and on the diagonal line 9—9 of Figs. 3 and 8 as viewed from above, but with the ejector parts in a different position.
Fig. 10 is a similar section on planes indicated by the bent line 10—10.
Fig. 11 is a partial section similar to Fig. 10 but with the ejector parts in a different position than appears in Figs. 9, 10 and 12 and in the position appearing in the other figures of the drawings.
Fig. 12 is a partial front elevation of the cap-sorting means as viewed from the left and looking slightly upward from the inclined line 12—12 in Figs. 3 and 8, but with the parts in the position appearing in Figs. 9 and 10 and as viewed from below in these figures.

In the automatic battery capping machine embodying my invention illustrated in the accompanying drawings, the uncapped battery cells 1, having usual carbon electrode rods 2 projecting from their open ends, are placed or deposited in the upper and outer end of a downwardly inclined feed chute 3 with the carbon electrode rods 2 projecting toward the rear of the machine, as appears in Figs. 5 and 8, these uncapped battery cells 1 being delivered from the lower end of the feed chute 3 one by one as needed for the capping operation which is performed by the machine of my invention. As the uncapped battery cells 1 roll downward in the chute 3 by gravity, the lowermost of these cells enters one of the notches of a peripherally notched or circumferentially recessed intermittently rotated cell-positioning turret 4, shown as provided with a central connecting hub portion and front and rear notched flanges, which are shown as having four peripheral cell-receiving notches therein, the notches in the rear flange being shown as slightly deeper than those in the front flange, as most clearly appears in Figs. 8 and 14 of the drawings. As viewed from the front of the machine, as appears in Fig. 5, the direction of rotation of the intermittently rotated cell-positioning turret 4 is in a counter-clockwise direction, the uncapped battery cells 1 being received horizontally at the right side in a notch of this turret during what may be termed the first period of rest of the turret, and when the turret 4 is rotated through a quarter turn or one-fourth of a rotation the uncapped battery cell 1 is brought to the capping position at the top of the turret 4, at what may be designated the second position or as being the second period of rest thereof, as will be clear from the drawings, particularly from Fig. 5 taken in connection with Fig. 8.

Figures 13, 14, 15, 16, 17:
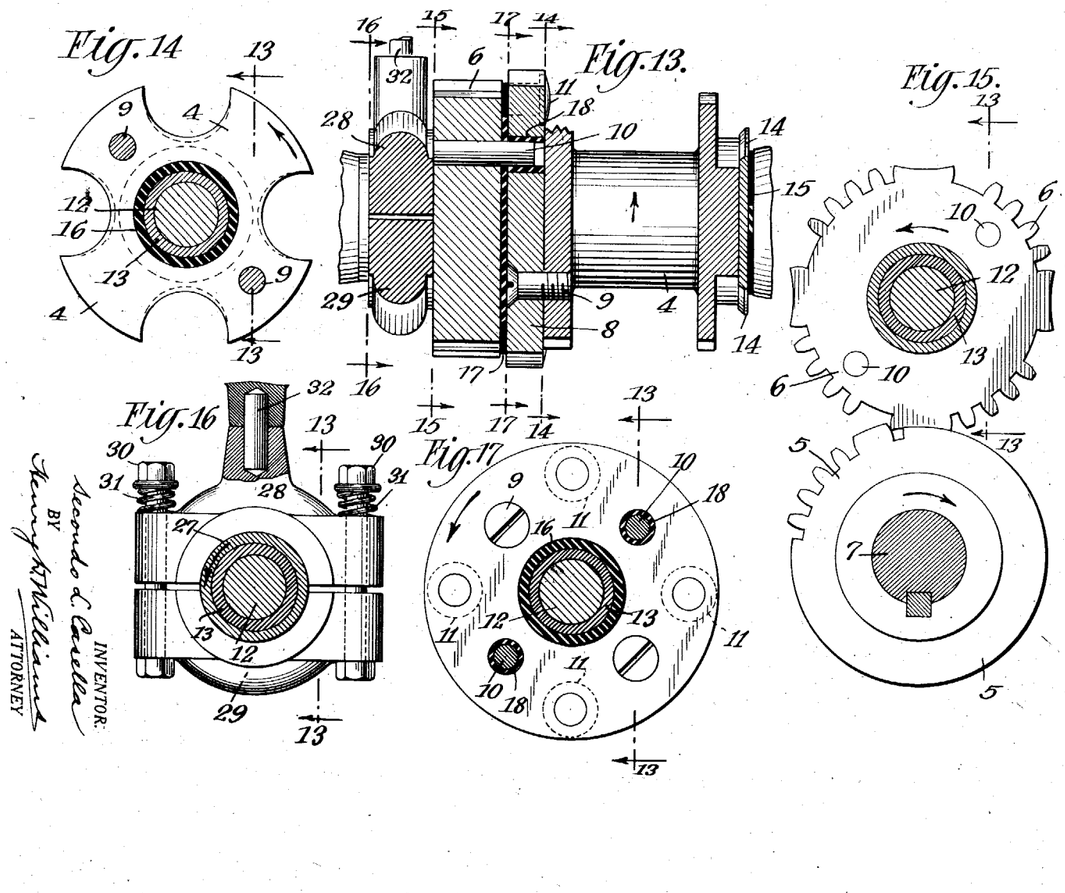
Fig. 13 is a further enlarged longitudinal section on a plane indicated by the line 13—13 of Figs. 5, 14, 15, 16 and 17 as viewed from the right in each of these figures.
Figs. 14, 15, 16 and 17 are similar vertical transverse sections on planes indicated by the corresponding lines of Fig. 13 as viewed from the left, but with the segmental driving gear added in the lower part of Fig. 15.

Intermittent rotation with intervening periods of rest is imparted to the cell-positioning turret 4 by means of intermittent gears forming a Geneva movement and comprising a continuously rotated mutilated or segmental driving gear 5 which in a well known manner clearly apparent from the drawings, particularly Fig. 15, imparts intermittent rotation to an intermittent driven gear 6, one-fourth of a rotation being imparted to the intermittently actuated driven gear 6 for each complete rotation of the continuously rotated driving gear 5 with intervening periods of rest of the driven gear 6, thereby imparting corresponding intermittent rotation with periods of rest to the cell-positioning turret 4, as is clear from the drawings and as will be readily understood. The segmental driving gear 5 is fixed upon a longitudinal driving shaft 7 by which it is continuously driven in a clockwise direction, as viewed from the front of the machine. The driving shaft 7 is journaled in the frame of the machine, as appears in the drawings, particularly in Figs. 1 and 3 thereof, this longitudinal driving shaft 7 for the gear 5 being also a cam shaft as will hereinafter appear.

The intermittently driven gear 6 is rotatively connected to the turret 4 by means of an intermediate disk 8 shown as secured by screws 9 to the front flange of the turret 4 and caused to partake of the movements of the intermittent gear 6 by means of anchor pins 10 which rotatively connect the intermittent gear 6 to the intermediate movement-transmitting disk 8. The movement-transmitting disk 8 is shown as provided at points opposite or corresponding to the cell-receiving notches in the forward flange of the cell-positioning turret 4 with a corresponding number of round headed studs 11, the rounded heads of which project into the cell-receiving notches of the turret flange and are for correctly longitudinally positioning the battery cells 1 relatively to the turret 4, these rounded heads of the studs 11 making contact with and forming abutments for the center of the bottoms of the cells, so that such cells will be correctly positioned regardless of the usual slight irregularities along their edges, which may be caused by lumps of solder or otherwise, and also so that the cap-applying thrust will be received by the strong substantially unyielding part of the bottom of the cells, and not by the thin usually slightly projecting lower edges of the cylindrical sides of the cells. The interconnected intermittent gear 6, movement-transmitting disk 8 and cell-positioning turret 4 are all mounted upon a stationary turret shaft 12 and between these parts and the shaft 12 there is shown as provided an intervening bushing 13, as appears in Figs. 3, 5 and 14 to 17 inclusive of the drawings, the stationary turret shaft 12 being supported in the frame of the machine, as clearly appears in the drawings, more particularly in Fig. 3 thereof. A small disk 14 forms a limiting flange at the rear end of the turret 4 for the open ends of the battery cells.

In view of the fact that the uncapped battery cells 1 are in a fully charged condition, it becomes necessary to protect them against being short-circuited through the metallic parts of the machine during the cap-applying operation. In the machine illustrated in the drawings this result is accomplished by electrically insulating the cell-positioning turret 4 and its immediate adjuncts from the other metallic parts of the machine. The cell-limiting flange 14 together with the turret 4 and its actuating disk 8 are insulated from the frame of the machine, from the intermediate metallic bushing 13 and from the intermittent gear 6 by means of an insulating washer 15, an insulating sleeve 16 and an insulating disk 17, as clearly appears in the drawings, particularly in Fig. 3 thereof. Also in this connection it is to be noted that the movement-transmitting anchor pins 10 are insulated from the intermediate movement-transmitting disk 8 by means of insulating bushings 18 in the disk 8 surrounding the projecting ends of the anchor pins 10, as most clearly appears in Figs. 13 and 17 of the drawings.

Figure 4:
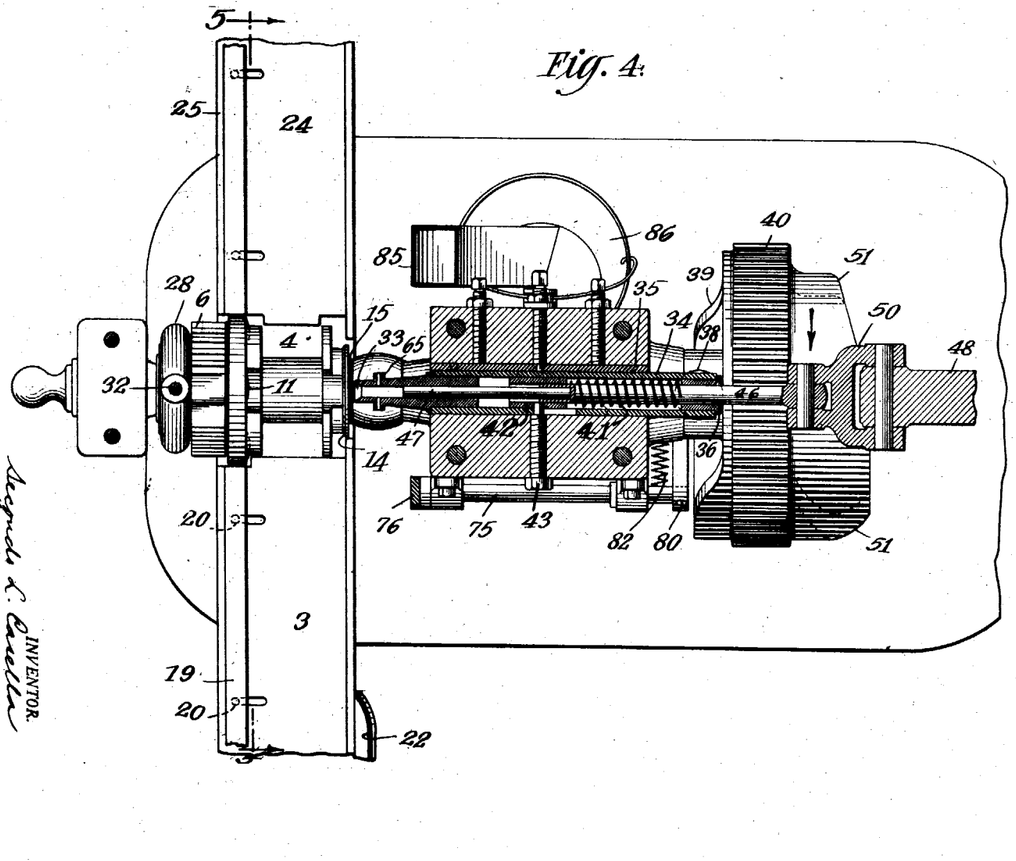
Fig. 4 is a similarly enlarged partial horizontal section on a plane indicated by the line 4—4 of Figs. 1, 2, 3 and 5.

The downwardly inclined feed chute 3 for the uncapped battery cells 1 is provided with a front guide rib 19 which is transversely adjustable of the chute 3 by means of securing bolts 20 passing through slots in the bottom of the chute 3, as more particularly appears in Figs. 4 and 7 of the drawings. At the rear or other side of the feed chute 3, this chute is shown as provided with an integral side flange forming a guide for the open ends of the uncapped battery cells 1, and in its upper part the chute 3 is shown as further provided with a higher outwardly inclined upstanding guard flange or wall 21 shown as attached by screws to the feed chute 3 and as insulated therefrom by a layer 22 of insulating material, as more particularly appears in Fig. 7. As a further precaution the feed chute 3 is also shown as insulated from the frame of the machine, to which it is secured by means of bolts 23, as more particularly appears in Fig. 5 of the drawings.

Figure 2:
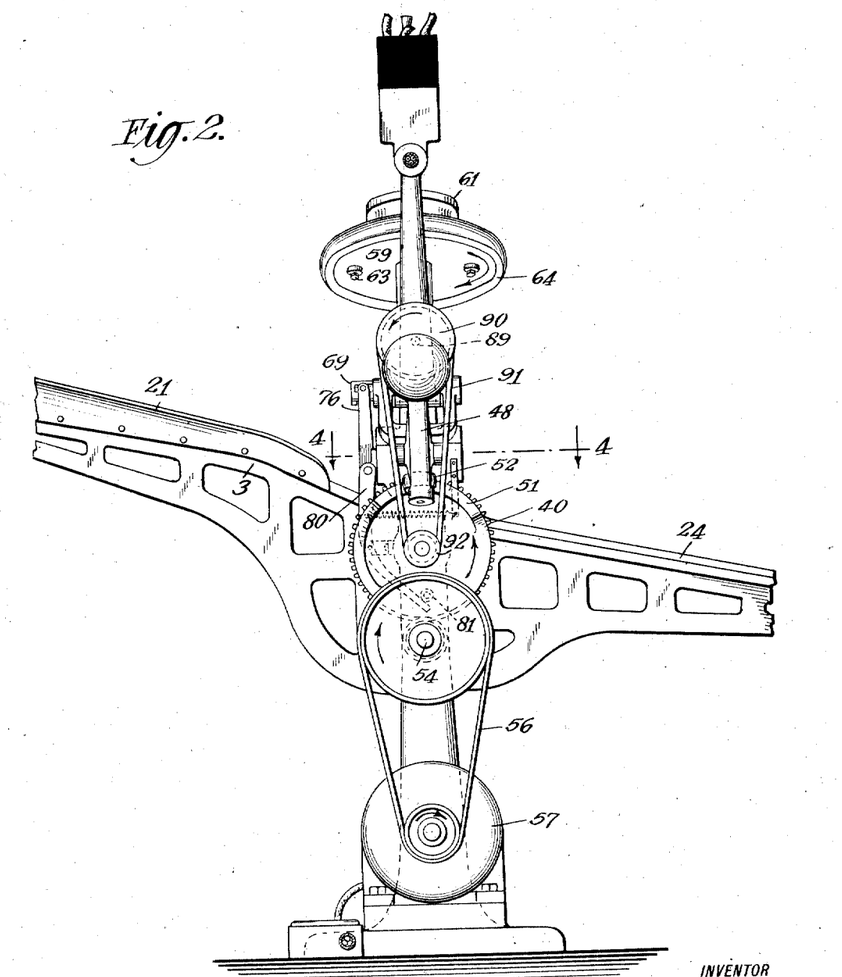
Fig. 2 is a rear elevation of the complete machine as viewed from the right in Fig. 1, with a few parts omitted or broken away.

At the other or delivery side of the machine from the feed chute 3 and at the other side of the cell-positioning turret 4, there is provided a downwardly inclined delivery chute 24 for the capped battery cells, as appears at the left in Fig. 5, in the upper part of Fig. 4, and at the right in the rear view in Fig. 2. This delivery chute 24 for the capped battery cells down which these cells roll from the notched turret 4 during the third period or at the third period of rest thereof, is provided at the front with an adjustable guide rib 25 similar to the guide rib 19 of the feed chute 3, and at the rear is shown as provided with an integral guide flange similar to the guide flange of the feed chute 3, hereinbefore described. The delivery chute 24, similarly to the feed chute 3, is also shown as insulated from the frame of the machine and from its securing bolts 26, as clearly appears in Fig. 5 of the drawings.

Figure 1:
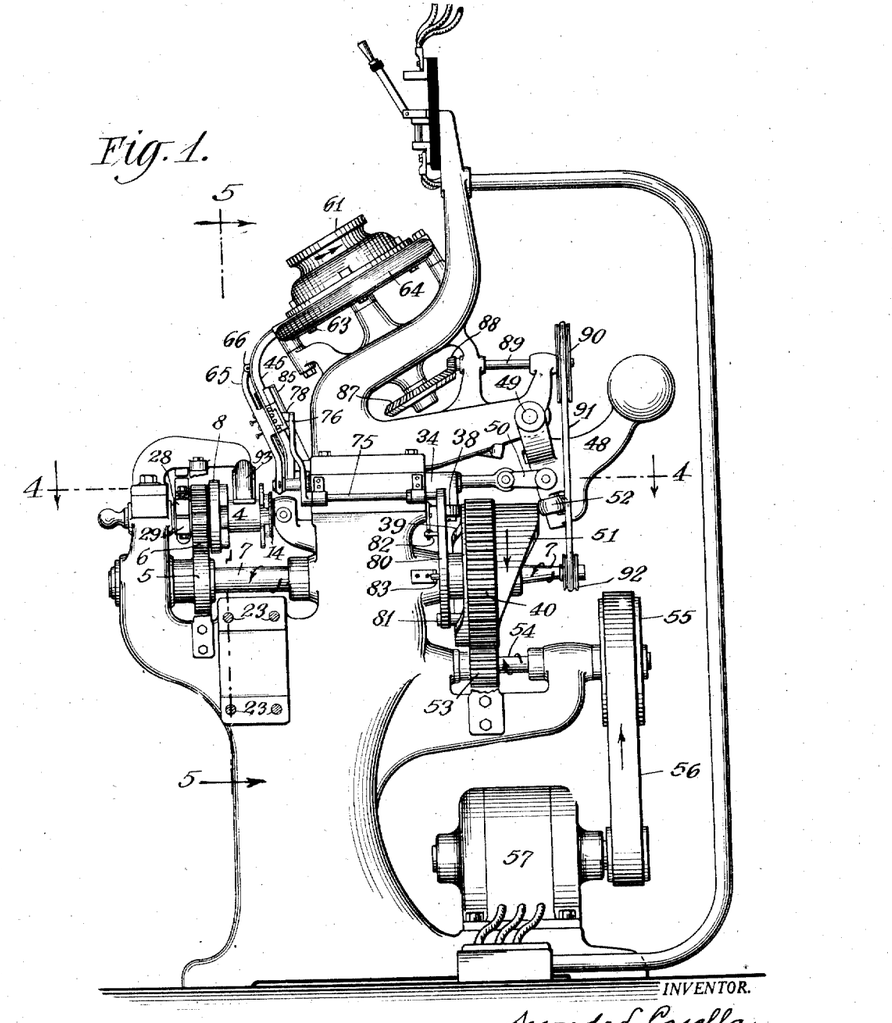
Figure 1 is a side elevation of a complete battery capping machine embodying my invention as viewed from the feed side thereof, with the feed chute for the uncapped battery cells and also the gear covers omitted.

In view of the quickness of the quarter turn rotation of the cell-positioning turret 4 and its adjuncts and the sudden stopping thereof at the completion of each quarter turn or one-fourth rotation, means are provided for absorbing some of the momentum of these parts so as to lessen the shock upon the intermittent driven gear 6 and the segmental driving gear 5 and other connected driving parts of the machine. For this purpose, the intermittent driven gear 6, at the forward side thereof, is shown as provided with a central extension forming a brake sleeve 27. This sleeve 27 of the gear 6 is gripped by upper and lower clamping members 28 and 29 forming a brake, these brake members 28 and 29 being pressed upon the sleeve 27 by means of clamp bolts 30 and compression springs 31, as shown in Figs. 1 and 16 of the drawings. The upper clamp member or brake member 28 is shown as anchored against rotation to a part of the frame of the machine by an anchor pin 32, as is shown in Figs. 3, 4, 13 and 16 of the drawings.

The means for driving the usual brass caps upon the projecting ends of the carbon electrode rods 2 of the uncapped battery cells 1, this operation taking place at the second position of rest of the cell-positioning turret 4 and at the top thereof, will now be described. A centering device is provided for the rearwardly projecting end of the carbon electrode rod 2 and comprises a sleeve or barrel 33 which is longitudinally movable and the bore of which at the projecting forward end is flaring or of funnel shape, as clearly appears in Figs. 3, 4, 5 and 8 of the drawings, so that as the longitudinally movable centering sleeve or barrel 33 moves forward, the rearwardly projecting end of the carbon electrode rod 2 will be engaged and guided into the central cylindrical bore of the barrel 33, regardless of whether this electrode rod happens to be exactly originally in alinement therewith or not, thereby assuring the correct positioning of this rod for the application of the end cap thereto, this relation of the parts being clearly illustrated in Fig. 8 of the drawings. The deeper cell-receiving notch hereinbefore mentioned in the forward flange of the cell-positioning turret 4 provides for the unobstructed carbon-centering action of the flaring outer or forward end of the carbon-centering barrel 33, by reason of the fact that thereby the rear open end of the battery cell is permitted to incline slightly downward so that, if necessary, it may be slightly raised by the forwardly advancing flaring end of the barrel 33, this relation and operation of the parts being most clearly shown in Fig. 8 of the drawings.

The carbon-centering barrel or sleeve 33 is fixed at its rear end in the forward end of the bore of a hollow longitudinally movable slide 34 which, in its movement, is guided in the frame of the machine and also, at one side thereof, is guided by an adjustable gib 35, as is shown most clearly in Fig. 4 of the drawings. The rear end of the bore of the tubular barrel-carrying slide 34 has fixed therein a tubular plug or bushing 36 shown as held in place therein by the inner reduced end of an actuating stud 37 which is a cam stud and carries a cam roller 38, as clearly appears in the drawings, particularly in Figs. 1, 3 and 4 thereof.

The carbon-centering barrel 33 is actuated in its forward carbon-centering movement by means of a rotary slide-actuating cam 39 carried by and shown as formed integral with a cam gear 40. The carbon-centering barrel 33 is retracted or returned rearwardly by means of a coiled thrust spring 41 acting between the rear bushing 36 and a tubular plug 42 within the bore of the slide 34 and which is held stationary therein by the inner reduced end of a screw-pin 43 in the frame of the machine and passing at its inner reduced end through a longitudinal slot in the longitudinally movable slide 34, as is shown in Fig. 4 of the drawings. The carbon-centering barrel 33 is provided, as appears in the drawings, particularly in Figs. 3 and 8 thereof, along its upper side with a cap-receiving slot into which the metallic end caps 44 for the electrode rods 2 are fed or supplied from the lower end of a somewhat irregularly shaped but generally downwardly extending cap chute 45, the lower end of which is shown as projecting into the cap-receiving slot in the upper side of the barrel 33 to the extent that the lowermost cap 44 from the chute 45 will rest upon the lower side of the wall of the cylindrical bore in the barrel 33 and so that this cap may be moved clear of the lower end of the chute 45, as is shown in Fig. 8 of the drawings. A limited supply of the metal end caps 44 is contained in the chute 45 and these caps form therein an intermittently descending column in which the end caps 44 are fed downward by gravity, all of these caps in the lower part of the chute 45 having their open ends directed toward the front end of the machine so that, as shown in Fig. 8, the lowermost cap, which is in alinement with the projecting end of a carbon electrode rod 2, will have its open end directed toward this rod.

Figure 3:
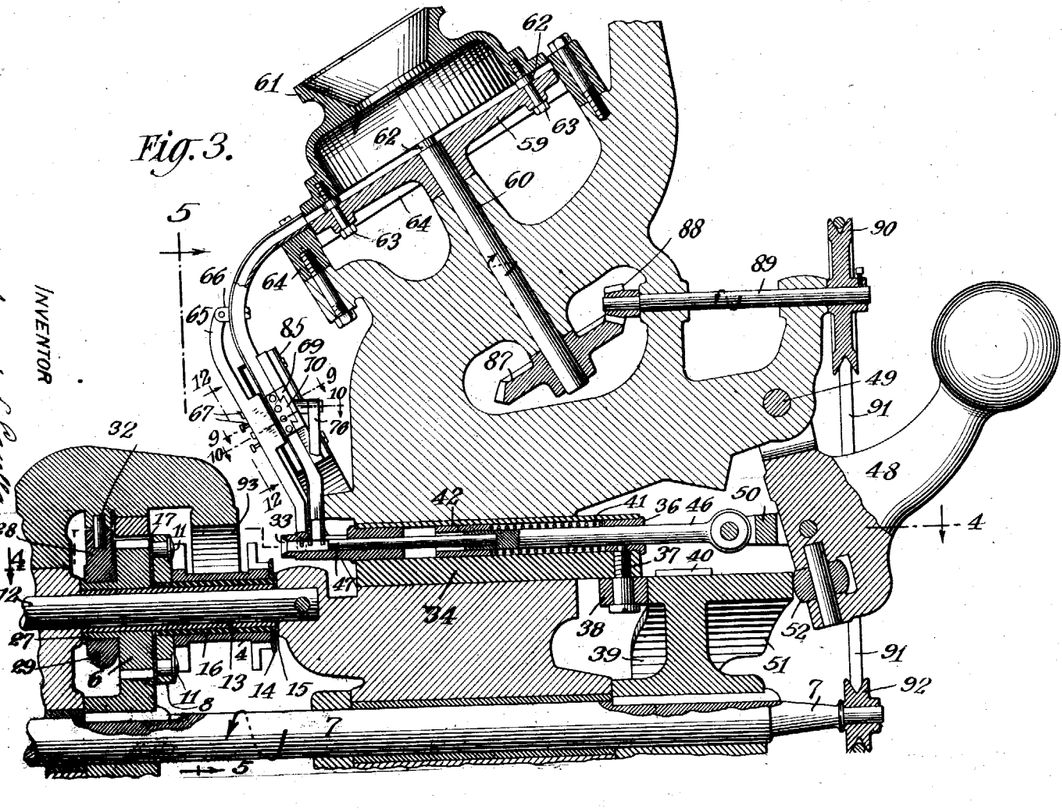
Fig. 3 is an enlarged central vertical longitudinal section of the machine as viewed in Fig. 1, but with parts omitted.

A hammer device, now to be described, is provided for moving the lowermost cap 44 from beneath the lower end of the cap chute 45 in the bore of the carbon-centering barrel 33 and driving it firmly over the projecting end of the alined carbon electrode rod 2. An endwise movable hammer shaft 46 is adapted to slide in and be guided by the bushing 36 in the rear end of the slide 34 and also is guided in the stationary tubular spring block or abutment sleeve 42, as is shown in Figs. 3 and 4. The forward end of the hammer shaft 46 is shown as recessed or provided with a socket in which is carried a cylindrical rod forming a hammer tip 47, the forward end of which is guided in the cylindrical bore of the cap barrel 33, and in its retracted position the forward end of the hammer tip 47 is just at the rear of the lowermost end cap 44 in the bore of the barrel 33, as is shown in Fig. 8 of the drawings. When the hammer tip 47 is driven forward this cap 44 will be slid along the inside of the barrel 33 and will be driven upon the alined projecting end of the carbon electrode rod 2 belonging to the until then uncapped battery cell 1 which is held at the capping position at the upper side of the cell-positioning turret 4 during its second period of rest.

The hammer shaft 46 and its cap-driving tip 47 are actuated in their capping movements by a gravity-impelled hammer 48 shown as pivoted to the upper part of the frame of the machine by means of a pivot pin 49 and as pivotally connected to the rear end of the hammer shaft 46 by means of an intermediate link 50. The swinging gravity-impelled hammer 48 is raised and permitted to drop at the proper time, by means of a face cam 51 carried by the cam gear 40 at the rear and other side thereof from the hereinbefore described slide-operating cam 39 and similarly shown as formed integral with the cam gear 40. The pivoted hammer 48 is shown as provided with a cam roller 52 which is engaged by the cam 51 gradually to raise the hammer 48 and then suddenly to permit the hammer 48 to drop, the hammer-operating cam 51 being provided, as appears in the drawings, with a gradually inclined cam face for gradually elevating the hammer 48 and with an abrupt shoulder or face, as also appears in the drawings, particularly in Fig. 3 thereof, so as to permit the sudden dropping of the hammer 48 in its capping operation, it being understood that as the hammer 48 is raised, the slidable hammer shaft 46 and its cap-applying tip 47 are retracted by the link 50 and that as the suddenly dropped hammer 48 descends, its movement will be imparted to the hammer shaft 46 and its tip 47 through the link 50. The hammer blows delivered to the hammer tip 47 by the hammer 48 have been found effectively to drive the caps 44 upon the ends of the electrode rods 2, the acquired momentum of the gravity-impelled hammer 48 being utilized for this purpose. Also this hammer arrangement has been found adequately to provide for the effective capping of carbon rods 2 of slight difference in length, which, as is well known in the art, commonly occurs in carbon rods 2 which are all supposed to be of the same length. The relative arrangement of the cam faces of the slide-operating cam 39 and of the hammer-operating cam 51 are such, as indicated in the drawings, particularly in Fig. 3, thereof, that the cap barrel 33 will be moved forward in advance of the capping movement of the hammer tip 47 so that the carbon electrode rods 2 will first be correctly centered in alinement with the barrel 33 and with the cap 44 contained therein, before the hammer tip 47 is operated. However, just before the hammer 48 is dropped by the abrupt shoulder on the cam 51, as above noted, the hammer tip 47 is permitted to have a slight initial forward movement by a slightly sloping surface on the cam 51, as appears in the drawings, particularly in Fig. 3, so that the lowermost cap 44 will be separated or segregated from those above it, the column of caps 44 in the cap chute 45 being then supported upon the forward end of the hammer tip 47. This arrangement prevents the possibility of two of the caps 44 descending one behind the other in front of the hammer tip 47, as otherwise might occur by reason of the frictional displacement of the lowermost cap 44 by the cap barrel 33 in its forward carbon-centering movement, as will be clear from Fig. 8. The contour and relation of the cams 39 and 51 are such, as appears in Fig. 3, that the cap barrel 33 and the hammer tip 47 move substantially together during the carbon-centering movement of the former, and after this the hammer 48 is suddenly dropped to cause the hammer tip 47 to drive the segregated lowermost cap 44 upon the projecting end of the carbon electrode rod 2. The carbon-centering cap barrel 33 and the cap-applying hammer tip 47 are thus operated once during each complete rotation of the cam-carrying cam gear 40, as will be readily understood and as is clearly evident from the drawings.

It has hereinbefore been described that the cell-positioning turret 4 partakes of one movement of a quarter rotation followed by a period of rest, once for each complete rotation of the segmental driving gear 5 which is carried by the longitudinal driving shaft 7. It is now to be noted that the cam gear 40 is fixed upon the rear end of this longitudinal driving shaft 7 to partake of the rotation thereof, as is clearly shown in the drawings. The cam gear 40 is shown as engaged and driven by a driving pinion 53 which is on a main drive shaft 54 journaled in the frame of the machine and shown as provided at its rear end with a driving pulley 55. The driving pulley 55 may be driven in any convenient way and in the machine illustrated in the drawings is shown as driven by means of a belt 56 from an electric motor 57 shown as mounted upon the base of the frame of the machine.

The curved and otherwise somewhat irregularly formed but generally downwardly directed cap chute 45 is of grooved cross section providing a back and sides, and at the front is provided with lateral cover strips 58 which provide between them a slot longitudinally of and down the middle of the cap chute 45, as most clearly appears in Figs. 8, 9, 10 and 11 of the drawings. A supply of the caps 44 is loosely contained in and supplied to the upper end of the cap chute 45, one by one, from an inclined rotating cap magazine shown as having a smooth disk-like inclined bottom part 59 fixed upon the upper end of an inclined magazine shaft 60 shown as journaled in the upper part of the frame of the machine. A peripherally flanged inverted cup-shaped receptacle part 61 of the cap magazine, shown as provided at the top with a central cap-receiving opening surrounded by a hopper-like funnel, is peripherally spaced in its lower flanged portion from the smooth flat surface of the bottom disk 59 of the magazine by means of washers or distance blocks 62 through which pass attaching bolts 63, as most clearly appears in Fig. 3 of the drawings. The peripheral or marginal annular space between the upper and lower magazine parts 59 and 61 is just sufficient to admit one layer of the caps 44 and this annular space is peripherally closed by means of a stationary ring 64 with which the caps 44, as the magazine rotates, are brought into contact and against which they may roll. At the lower side of the inclined cap magazine a notch or gap is provided in this stationary ring 54, this notch or gap opening into the upper end of the cap chute 45, as perhaps most clearly appears in Fig. 3 of the drawings, so that as the inclined cap magazine rotates, the caps 44 are permitted to enter one by one into the upper end of the cap chute 45, the proportions or dimensions of which are such that the caps will only fit and can only enter therein sidewise of the caps, as is clearly indicated in Fig. 8 of the drawings. By reason of the agitation of the caps 44 in the magazine, produced by the rolling about of the caps 44 within the inclined rotating magazine, it has been found that by far the greater number of these caps, commonly as many as nine-tenths of them, will be caused to enter the upper end of the cap chute 45 with their closed ends down, so that when they descend through the cap chute 45 around the curve thereof, they will have their open ends directed toward the front end of the machine and may be permitted thus to descend into the carbon-positioning cap barrel 33, thence successively to be driven over the projecting ends of the carbon electrode rods 2, as hereinbefore described. However, all of the caps 44 which come opposite the upper end of the cap chute 45 will not be thus in correct position and some of these caps will enter the upper end of the cap chute 45 in the reversed position and will descend therein with their closed ends toward the front end of the machine. Cap-sorting means, now to be described, are provided for selecting and ejecting the reversed caps 44 from the cap chute 45 before they reach the lower end thereof, while permitting the correctly positioned caps 44 to descend to the capping position in the barrel 33. Such cap-sorting means comprises a cap-selecting device and a cap-ejecting device.

The cap-selecting device, for selecting and retaining those caps 44 the open ends of which are directed toward the front end of the machine and for rejecting those caps 44 in the cap chute 45 which descend therein in the reversed position, includes a selector arm or selector member 65 arranged at the front of the cap chute 45 and shown as pivoted at its upper end to a clip 66 mounted upon the cap chute 45. At its lower end the selector lever 65 is bifurcated and is pivoted by means of a slotted connection, as appears in the drawings, of which see Figs. 1, 3, 4, 5 and 8 more particularly, to the projecting forward end of the carbon-positioning cap barrel 33, so that this selector lever or arm 65 will be rocked by the forward and back movement of the cap barrel 33. At an intermediate point thereof the selector arm 65 carries a longitudinal series of cap-selectors, shown as spring-pressed cap-selecting feelers or fingers 67, shown as four in number, having rounded cap-engaging inner ends forming heads and also shown as having movement-limiting outer heads. These cap-selecting feelers or fingers 67 pass through and are guided by a thickened part of the selector arm 65, and are pressed rearwardly by individual coiled thrust springs 68 which act, as appears in the drawings, between the inner cap-engaging heads of the fingers 67 and shoulders shown as formed in the finger-containing apertures in the selector arm 65.

When the selector arm 65 is rocked toward the front end of the machine by the carbon-centering forward movement of the cap barrel 33, the inner rounded ends of the selector fingers 67 will be moved free from and out of engagement with the caps 44 contained in the cap chute 45, but, upon the rearward or return movement of the cap barrel 33, the inner cap-engaging rounded ends of the cap-selecting fingers 67 will engage and press upon the caps contained in the cap chute 45, these fingers entering or passing through the longitudinal slot provided at the front of the cap chute 45 by means of the spaced side pieces or flange-providing cover strips 58. The cap-selecting fingers 67 are so spaced and located or arranged that the inner end of each one of these spring-pressed fingers will engage one of the caps 44 contained in the cap chute 45, and if this cap 44 engaged by a finger 67 is in the correct position with its open end directed toward the front end of the machine, then the inner rounded head of the cap-selecting finger 67 will enter such cap and during its engagement therewith will hold such cap securely within the cap chute 45 and will prevent the cap 44 thus held from being ejected from the cap chute 45; but any of the descending caps 44 which happen to be in the reversed position with their closed ends directed toward the front of the machine will not be thus retained by the cap-selecting fingers 67 which will then merely press upon the closed ends of these revered caps and will be unable to restrain them from being ejected from the cap chute 45 by means of a suitable ejecting device now to be described.

At the delivery side of the machine, which is the left side thereof as viewed from the front and as appears in Fig. 5, for example, the side flange of the cap chute 45 is discontinued so as to provide an escape gap opposite the spring-pressed cap-selecting fingers 67, as most clearly appears in Figs. 9, 10, 11 and 12 of the drawings. A T-shaped bracket 69, shown as forming the back of the cap chute 45 at this point, has an arm projecting laterally toward the feed side of the machine and this arm is provided with an undercut or dove-tail groove forming a guideway for an ejector member or ejector slide 70, as most clearly appears in Figs. 3 and 8 to 12 inclusive of the drawings. The ejector slide 70 carries four spring-pressed ejectors, shown as cap-ejecting fingers or plungers 71, corresponding to and respectively arranged in the same transverse plane as the cap-selecting fingers 67, as perhaps most clearly appears in Fig. 12 of the drawings. These cap-ejecting fingers or plungers 71 are shown as provided with outer movement-limiting heads and as also provided with intermediate collars for receiving the thrust of ejector spring 72 which respectively surround the cap-ejecting fingers 71 and act between the thrust-receiving collars thereon and the slide 70 through which the cap-ejecting fingers 71 slide, as clearly appears in the drawings. In this connection it is to be noted that the inner ends of the cap-ejecting fingers 71 pass through openings in and are guided by the adjacent side of the cap chute 45, as most clearly appears in Figs. 9, 10 and 11. A guide bar 73, shown as carried by an arm 74 mounted upon the ejector slide 70, is provided to close the escape gap hereinbefore mentioned, in the side of the cap chute 45, during the time that the cap-ejecting fingers 71 are in the retracted position, as more particularly appears in Figs. 5 and 11.

It will now be understood that when the ejector slide 70 is moved toward the cap chute 45, all of the caps 44 which are not in the correct position, so as to be held by the entrance thereinto of the cap-selecting fingers 67, will be ejected or pushed out of the cap chute 45 by the corresponding spring-pressed cap-ejecting fingers 71, as is clearly illustrated in Fig. 9, while, on the other hand, all of the caps 44 which are in the correct position, with their open ends directed toward the front of the machine, will be held by the corresponding cap-selecting fingers 67 against ejection by the spring-pressed cap-ejecting fingers 71, the ejecting springs 72 of which will yield, as is clearly illustrated in Figs. 8, 10 and 12 of the drawings. The arrangement and manner of operation is such, as will be readily understood, that the ejecting slide 70, carrying the spring-pressed ejecting fingers 71, will be operated in its cap-ejecting movement and retracted away from such ejecting position during the time that the selector arm 65 is holding the spring-pressed cap-selecting fingers 67 in their cap-engaging and cap-selecting position, thereby assuring that all of the reversely turned caps 44 shall be ejected and that all of the correctly positioned caps 44 shall be restrained, by the corresponding cap-selecting fingers 67, against being ejected, the movements of the selector arm 65 and of the ejector slide 70 being properly timed to produce this result. The operating means for the ejector slide 70 will now be described.

For operating the ejector slide 70 and the cap-ejecting fingers 71 carried thereby, an ejector-operating rock-shaft 75 extends longitudinally of and is journaled on the side of the frame of the machine, as clearly appears in the drawings. At its forward end the ejector-operating rock-shaft 75 carries an upstanding ejector arm 76, the upper free end of which is pivoted, with a slotted connection, to the ejector slide 70 by means of a pivot pin or pivot stud 77 and an intermediate slide-operating block 78. The latter is shown as flanged and as secured by means of bolts 79 to the back of the ejector slide 70, together with the arm 74 which carries the slot-closing bar 73 for the slot in the cap chute 45, the bracket 69, which guides and supports the ejector slide 70 and its adjuncts, being shown as provided with a slot or opening to provide for the bolting of the arm 74 and slide block 78 to the ejector slide 70, as most clearly appears in Figs. 9 and 10 of the drawings.

The rear end of the ejector-operating rock-shaft 75 carries a bent cam arm or cam lever 80 which extends downwardly and inwardly and is adapted to be engaged and operated by a cam roller 81 shown as mounted upon and projecting from the forward side of the cam gear 40, this cam roller 81 being, of course, so positioned upon the cam gear 40 that the bent cam arm 80 will be operated in proper timed relation to impart cap-ejecting movement to the ejector slide 70 at the proper time while the cap-selecting fingers 67 are held in the cap-engaging position during a period of rest of the selector arm 65. The cam arm 80 is moved in the reverse position, to retract or return the ejector head or ejector slide 70 and thereby to withdraw the cap-ejecting fingers 71, by means of a retractile spring 82 attached thereto and anchored to the frame of the machine, as appears in the drawings, a stop bracket 83 being provided to be engaged by a pin 84 on the cam arm 80 to limit the return movement of the cam arm 80. In this connection it should also be noted that the return movement of the ejector slide 70, together with the spring-pressed ejecting fingers 71 carried thereby and of the slot-closing bar 73, also carried by the ejector slide 70 by means of the arm 74, have their return movement limited by reason of the bent outer end of the arm 74 coming into contact with the notched edge of the supporting bracket 69, which at this point forms the back of the cap chute 45, as hereinbefore described, so that in this retracted position of the ejector parts, the slot-closing bar 73 will form a continuation of the corresponding side flange of the cap chute 45 for guiding the downwardly moving end caps 44, as is perhaps most clearly illustrated in Fig. 11 of the drawings, illustrating this retracted position of the ejector parts.

It has been hereinbefore stated that by far the larger number of the caps 44 descending through the cap chute 45 will be in the correct position, while it will be noted that in Fig. 8 of the drawings half of these caps from the lowermost cap-selecting finger 67 upward are shown as in the reversed or incorrect position, this, being, however, merely for the purpose of better illustrating the operation of the cap-selecting and cap-ejecting devices, which together form the cap-sorting means. A plurality of the cap-selecting fingers 67 and a corresponding plurality of the cap-ejecting fingers 71 are provided in order to provide for the comparatively rare contingency when two or more of the caps 44 will in succession descend in the reversed or incorrect position, and by means of a mathematical calculation it has been found that a plurality of four of these sets of fingers, such as appears in the machine illustrated in the drawings, will provide for the almost inconceivably rare contingency of twelve of the caps 44 following each other in succession in the reversed position, and therefore will substantially assure that all of the caps below the cap-selecting and cap-ejecting devices shall be in the correct position.

The ejected or discarded caps 44 drop through a chute 85 into a receptacle or bucket 86 shown as hung upon the side of the machine and these caps may be returned to the cap-containing magazine at the top of the machine. The cap magazine shaft 60 is continuously rotated at a suitable speed.

A bevel gear 87 is fixed upon the lower end of this shaft and is engaged by a driving pinion 88 fixed upon the forward end of a short horizontal shaft 89 journaled in the frame of the machine and shown as provided at its rear end with a grooved pulley 90 from which it is driven from the longitudinal driving shaft or cam shaft 7 by means of a round belt 91 which passes over a small driving pulley 92 fixed upon the extreme reduced rear end of the longitudinal cam shaft 7, as is clearly shown in the drawings. A circularly- curved guide or guard 93, shown as formed in one piece with a part of the machine frame, is provided above the cell-positioning turret 4, in order to prevent the escape of the battery cells from the peripheral cell-receiving notches in the turret 4 during the rotation of the latter.

The operation of the machine as to all of its parts has been hereinbefore described in connection with the description of the construction and arrangement thereof. As to the general operation there is only to be noted that the uncapped battery cells 1 are deposited manually in the upper part of the feed chute 3 whence they descend by gravity to the cell-positioning turret 4, and that the capped battery cells, which are delivered to the curved sharply downwardly inclined upper end of the delivery chute 24 by the turret 4, are removed by hand from the lower end of this delivery chute 24. The speed of operation of the particular machine illustrated in the drawings is at a rate of a little more than one hundred and twenty-five capped battery cells per minute. It has been found in practice that this automatic battery capping machine requires practically no attention in operation other than to keep it supplied with the uncapped cells 1, to keep a supply of caps 44 in the cap magazine and to remove or take away the capped cells.

It is obvious that various modifications may be made in the construction shown in the drawings and above particularly described within the principle and scope of my invention.

I claim:

1. A battery capping machine comprising a capping hammer, a circumferentially recessed cell-positioning turret for receiving a battery cell in each of said recesses and for successively bringing the battery cells into the capping position each with its projecting electrode rod in the path of the hammer, means for intermittently rotating the turret with intervening periods of rest thereof, cap-feeding means for delivering a cap into the path of the hammer with its open end directed toward the projecting end of the electrode rod of the positioned battery cell, and means for operating the hammer to drive the cap upon the electrode rod.

2. A battery capping machine comprising a gravity-impelled capping hammer, means for periodically raising the hammer and letting it drop, a circumferentially recessed cell-positioning turret for receiving a battery cell in each of said recesses and for successively bringing each of the battery cells into the capping position with its projecting electrode rod in the path of the hammer in its gravity-impelled movement, means for intermittently rotating the turret with intervening periods of rest thereof, and cap-feeding means for delivering a cap into the path of the hammer in its gravity-impelled movement and with the open end of the cap directed toward the projecting end of the electrode rod of the positioned battery cell.

3. A battery capping machine comprising a capping hammer, cell-positioning means for bringing a battery cell to the capping position with its projecting electrode rod in the path of the hammer, cap-feeding means for delivering a cap into the path of the hammer with its open end directed toward the projecting end of the electrode rod of the positioned battery cell, and means for operating the hammer to drive the cap upon the electrode rod; said cap-feeding means including a chute for the caps, and cap-sorting means controlled by the position of the caps in the chute and adapted to select and eject from the chute before they reach the capping position those caps which are in the reversed position in the chute.

4. A battery capping machine comprising a capping hammer, cell-positioning means for bringing a battery cell to the capping position with its projecting electrode rod in the path of the hammer, cap-feeding means for delivering a cap into the path of the hammer with its open end directed toward the projecting end of the electrode rod of the positioned battery cell, and means for operating the hammer to drive the cap upon the electrode rod; said cap-feeding means including a chute for the caps, and cap-sorting means controlled by the position of the caps in the chute and adapted to select and eject from the chute before they reach the capping position those caps which are in the reversed position in the chute; said cap-sorting means comprising a spring-pressed feeler movable toward and away from the caps in the chute and adapted to enter the open end of a correctly positioned cap or to ride upon the closed end of a reversed cap in the chute, and a spring-pressed ejector for ejecting from the cap chute a cap not held therein by the feeler entering the cap.

5. A battery capping machine comprising a peripherally notched cell-positioning turret for receiving a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, and means for operating the hammer tip to drive the cap upon the projecting end of the electrode rod.

6. A battery capping machine comprising a feed chute for the battery cells, a peripherally notched cell-positioning turret for receiving from the feed chute a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, means for operating the hammer tip to drive the cap upon the projecting end of the electrode rod, and a delivery chute for receiving the capped battery cells from the intermittently rotating turret.

7. A battery capping machine comprising a peripherally notched cell-positioning turret for receiving a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, and means for operating the hammer tip to drive the cap upon the projecting end of the electrode rod; the said operating means for the hammer tip comprising a pivoted gravity-impelled hammer, and a rotating cam for raising the hammer and letting it drop.

8. A battery capping machine comprising a peripherally notched cell-positioning turret for receiving a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, and means for operating the hammer tip to drive the cap upon the projecting end of the electrode rod; said cap-feeding means including a chute for the caps, a rotating cap-containing magazine for delivering caps to the upper end of the cap chute, and cap-sorting means for selecting and ejecting from the cap chute those caps which descend therein in reversed position, whereby each of the caps delivered from the cap chute into the barrel at the front of the hammer tip will have its open end directed toward the projecting end of the electrode rod of the battery cell which is brought to the capping position.

9. A battery capping machine comprising a peripherally notched cell-positioning turret for receiving a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, and means for operating the hammer tip to drive the cap upon the projecting end of the electrode rod; said cap-feeding means including a chute for the caps, a rotating cap-containing magazine for delivering caps to the upper end of the cap chute, and cap-sorting means for selecting and ejecting from the cap chute those caps which descend therein in reversed position, whereby each of the caps delivered from the cap chute into the barrel at the front of the hammer tip will have its open end directed toward the projecting end of the electrode rod of the battery cell which is brought to the capping position; said cap-sorting means comprising a set of spring-pressed feelers adapted to enter the open ends or to ride upon the closed ends of the caps in the cap chute according to the position in which the caps are disposed therein, means for concurrently moving all of said feelers away from and toward the caps in the chute, a set of spring-pressed ejectors for ejecting from the cap chute all of the caps not held therein by the feelers which enter the caps, and means for operating all of the ejectors at once.

10. A battery capping machine comprising a peripherally notched cell-positioning turret for receiving a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, and means for operating the hammer tip to drive the cap upon the projecting end of the electrode rod; the means for operating the said rod-centering barrel comprising a rotating cam for imparting the rod-centering movement to said barrel, and means for retracting the barrel away from such rod-centering position.

11. A battery capping machine comprising a peripherally notched cell-positioning turret for receiving a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, and means for operating the hammer tip to drive the cap upon the projecting end of the electrode rod; the means for imparting intermittent rotation to said turret comprising an intermittently operated driven gear for transmitting corresponding intermittent rotation to the turret, and a continuously rotating segmental driving gear for imparting intermittent rotation to said intermittently driven gear.

12. A battery capping machine comprising a feed chute for the battery cells, a peripherally notched cell-positioning turret for receiving from the feed chute a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, means for operating the hammer tip to drive the cap upon the projecting end of the electrode rod, a delivery chute for receiving the capped battery cells from the intermittently rotating turret, and a continuously acting brake on the intermittently rotating turret for absorbing the momentum thereof.

13. A battery capping machine comprising a feed chute for the battery cells, a peripherally notched cell-positioning turret for receiving from the feed chute, a battery cell in each of its notches and for successively bringing the battery cells into the capping position, means for intermittently rotating the turret with intervening periods of rest thereof, an endwise movable hammer tip with which the electrode rods of the battery cells are brought substantially into alinement by the intermittently rotating turret, an endwise movable rod-centering barrel surrounding the hammer tip and having its bore flaring at the outer end for bringing the electrode rod of each battery cell into alinement with the hammer tip, such barrel having a cap-receiving opening in one side thereof, cap-feeding means for successively feeding the caps into the barrel at the front of the hammer tip with the open end of each cap directed toward the projecting electrode rod of the battery cell, means for imparting longitudinal rod-centering movement to the barrel, means for operating the hammer tip to drive the cap upon the projecting end of the electrode rod, and a delivery chute for receiving the capped battery cells from the intermittently rotating turret; said cap-feeding means including a chute for the caps, a rotating cap-containing magazine for delivering caps to the upper end of the cap chute, and cap-sorting means for selecting and ejecting from the cap chute those caps which descend therein in reversed position, whereby each of the caps delivered from the chute into the barrel at the front of the hammer tip will have its open end directed toward the projecting end of the electrode rod of the battery cell which is at the capping position; said cap-sorting means comprising a set of spring-pressed feelers adapted to enter the open ends or to ride upon the closed ends of the caps in the cap chute according to the position in which the caps are disposed therein, means for moving said feelers all at the same time away from and toward the caps in the chute, a set of spring-pressed ejectors for ejecting from the cap chute all of the caps not held therein by the feelers which enter the caps, and means for operating all of the ejectors at once; said cap-containing magazine comprising an inclined rotating bottom part, an upper cap-containing receptacle part rotative with the bottom part and similarly inclined and peripherally spaced from the bottom part to provide a peripheral cap-receiving annular space between the upper and lower parts of the magazine, and a stationary ring member peripherally surrounding the upper and lower magazine parts and closing said cap-receiving annular space, such ring member being provided at the lower side of the inclined magazine with a gap for the escape one by one of the caps from the magazine into the upper end of the cap chute.

14. A battery capping machine having, in combination, an inclined rotative cap-containing magazine comprising upper and lower parts spaced from each other around their peripheral margins to provide an annular cap-receiving space, and a stationary ring peripherally surrounding the two parts of the magazine and closing such annular cap-receiving space, such stationary ring being provided at the lower side of the inclined magazine with an opening for the escape of the caps one by one from the magazine.

15. A battery capping machine having, in combination, a cap-supplying and cap-containing chute, a cap-sorting means controlled by the position of the caps in the chute for ejecting from the chute caps which are not correctly positioned therein and for retaining in the chute caps which are correctly positioned therein.

16. A battery capping machine having, in combination, a cap-feeding and cap-containing chute, a cap-selecting device controlled by the position of the caps in the chute and adapted to hold in the chute those caps which are in the correct position therein, and a cap-ejecting device for ejecting from the chute those caps which are not held in the chute by the cap-selecting device.

17. A battery capping machine having, in combination, a cap-feeding and cap-containing chute, a cap-selecting device for retaining in the chute caps which are in the correct position therein and for rejecting caps in the chute which are not in the correct position therein, and a cap-ejecting device for ejecting from the chute caps which are not retained in the chute by the cap-selecting device; said cap-selecting device comprising a finger-carrier movable toward and away from the cap-containing chute, and a spring-pressed cap-selecting finger carried by such finger-carrier and engageable with the caps in the chute.

18. A battery capping machine having, in combination, a cap-feeding and cap-containing chute, a cap-selecting device for retaining in the chute caps which are in the correct position therein and for rejecting caps in the chute which are not in the correct position therein, and a cap-ejecting device for ejecting from the chute caps which are not retained in the chute by the cap-selecting device; said cap-selecting device comprising a spring-pressed cap-selector movable toward and away from the cap-containing chute and engageable with the caps in the chute; and said cap-ejecting device comprising a spring-pressed ejector movable transversely to the path of movement of the cap-selector.

19. A battery capping machine having, in combination, a cap-feeding and cap-containing chute, a cap-selecting device for retaining in the chute caps which are in the correct position therein and for rejecting caps in the chute which are not in the correct position therein, and a cap-ejecting device for ejecting from the chute caps which are not retained in the chute by the cap-selecting device; said cap-selecting device comprising a selector member movable toward and away from the cap-containing chute, and a spring-pressed cap-selecting finger carried by said selector member and engageable with the caps in the chute; and said cap-ejecting device comprising an ejector member movable transversely to the path of movement of said selector member, and a spring-pressed cap-ejecting finger carried by said ejector member and engageable with the caps in the chute.

20. A battery capping machine having, in combination, a cap-feeding and cap-containing chute, a cap-selecting device for retaining in the chute caps which are in the correct position therein and for rejecting caps in the chute which are not in the correct position therein, and a cap-ejecting device for ejecting from the chute caps which are not retained in the chute by the cap-selecting device; said cap-selecting device comprising a selector member movable toward and away from the cap-containing chute, and a series of spring-pressed cap-selecting fingers carried by such selector member and engageable with the caps in the chute; and said cap-ejecting device comprising an ejector member movable substantially at right angles to the path of movement of the selector member, and a series of spring-pressed cap-ejecting fingers corresponding in number to the cap-selecting fingers and carried by the ejector member and engageable with the caps in the chute.

21. A battery capping machine having, in combination, a chute for the caps, a set of spring-pressed feelers adapted to enter the open ends of correctly positioned caps or to ride upon the closed ends of caps in the reversed position in the chute, means for moving said feelers all at the same time away from and toward the caps in the chute, a set of spring-pressed ejectors for ejecting from the cap chute caps not held therein by the feelers entering the caps, and means for operating all of the ejectors at once.

22. A battery capping machine having, in combination, a chute for the caps, a selector member movable toward and away from the cap-containing chute, a series of spring-pressed cap selectors carried by the selector member and adapted to enter the open ends of correctly positioned caps or to ride upon the closed ends of caps in the reversed position in the chute, an ejector member movable transversely to the path of movement of the selector member, a series of spring-pressed cap ejectors carried by the ejector member for ejecting from the chute caps not held therein by the selectors entering the caps, an escape gap in the chute being provided for the passage of the ejected caps, and a guide bar for the caps in the chute carried by the ejector member and adapted to close said escape gap in the retracted position of the cap ejectors.

23. A battery capping machine comprising means for supporting a battery cell at the capping position, an endwise movable hammer tip directed toward the projecting electrode rod of the positioned battery cell, an endwise movable rod-centering barrel surrounding the hammer tip and having its bore flaring at the outer end for bringing the electrode rod of the battery cell into alinement with the hammer tip, such barrel having a cap-receiving opening in one side thereof, cap-feeding means for successively feeding the caps through said opening into the barrel at the front of the hammer tip with the open end of each cap directed toward the projecting electrode rod of the battery cell, such cap-feeding means including a chute through which the caps descend, means for imparting longitudinal rod-centering movement to the barrel, and means for operating the hammer tip to drive the cap upon the projecting end of the electrode rod, the said operating means for the hammer tip being adapted to impart a slow initial forward movement to the hammer tip during the rod-centering movement of the barrel, so that the hammer tip will close the lower end of the cap chute and whereby the descent of more than one cap into the barrel at the front of the hammer tip is prevented.

24. A battery capping machine having, in combination, means for supporting at the capping position a battery element having a projecting electrode rod, a centering device for the projecting end of the electrode rod, means for feeding a cap into position with its open end directed toward said projecting end of the electrode rod, and means movable relatively to said centering device for driving the cap upon the end of the electrode rod.

25. A battery capping machine having, in combination, means for supporting at the capping position a battery element having a projecting electrode rod, an endwise movable hammer tip directed toward the projecting electrode rod, an endwise movable rod-centering member surrounding the hammer tip for bringing the electrode rod into alinement with the hammer tip, means for feeding a cap into position at the front of the hammer tip with the open end of the cap directed toward the projecting electrode rod, means for imparting longitudinal rod-centering movement to said centering member, and means for operating the hammer tip to drive the cap upon the projecting end of the electrode rod.

26. A battery capping machine comprising means for successively bringing into the capping position battery elements having projecting electrode rods, an endwise movable hammer tip with which the electrode rods are brought substantially into capping relation, an endwise movable rod-centering member surrounding the hammer tip and having a flaring outer end for bringing the electrode rod into capping position relatively to the hammer tip, cap-feeding means for successively feeding the caps into the capping position at the front of the hammer tip with the open end of each cap directed toward the projecting electrode rod, means for imparting rod-centering movement to said member, and means for operating the hammer tip to drive the cap upon the projecting end of the electrode rod.

27. A battery capping machine having, in combination, means for supporting at the capping position a battery element having a projecting electrode rod, an endwise movable hammer tip directed toward the projecting electrode rod, an endwise movable cap-guiding and rod-centering barrel surrounding the hammer tip and having a flaring outer end for bringing the electrode rod into alinement with the hammer tip, means for successively feeding the caps into the barrel at the front of the hammer tip with the open end of each cap directed toward the projecting electrode rod, means for imparting rod-centering movement to the barrel, and means for operating the hammer tip to drive the cap upon the projecting end of the electrode rod.

28. A battery capping machine having, in combination, means for supporting at the capping position a battery element having a projecting electrode rod, an endwise movable hammer tip directed toward the projecting electrode rod, an endwise movable cap-guiding and rod-centering barrel surrounding the hammer tip and having a flaring outer end for bringing the electrode rod into alinement with the hammer tip, such barrel having a cap-receiving opening in one side thereof, cap-feeding means for successively feeding the caps through said opening into the barrel at the front of the hammer tip with the open end of each cap directed toward the projecting electrode rod, means for imparting longitudinal rod-centering movement to the barrel, and means for operating the hammer tip to push the cap along the barrel and drive it upon the projecting end of the electrode rod.

In testimony whereof I have affixed my signature.

SECONDO L. CASELLA.